# United States Patent [19]

Kitagawa et al.

[11] 4,237,254
[45] Dec. 2, 1980

[54] PROCESS FOR PRODUCING OLEFIN POLYMERS

[75] Inventors: Sadao Kitagawa, Yokohama; Isao Okada, Yokohama; Teruo Saito, Yokohama; Shoichi Masukawa, Amimachi; Yoshihisa Watanabe, Amimachi; Makoto Imanari, Amimachi, all of Japan

[73] Assignee: Mitsubishi Petrochemical Company Limited, Tokyo, Japan

[21] Appl. No.: 899,999

[22] Filed: Apr. 25, 1978

[30] Foreign Application Priority Data

Apr. 30, 1977 [JP] Japan .................................. 52-50272
Jan. 9, 1978 [JP] Japan ..................................... 53-960

[51] Int. Cl.$^3$ ......................... C08F 4/02; C08F 10/06
[52] U.S. Cl. ................................. 526/122; 252/429 B; 526/124; 526/125; 526/351; 526/902; 526/906
[58] Field of Search ............... 526/124, 125, 122, 114, 526/116

[56] References Cited

U.S. PATENT DOCUMENTS

| 3,987,233 | 10/1976 | Sato et al. | 526/124 |
| 4,076,924 | 2/1978 | Toyota et al. | 526/125 |
| 4,107,414 | 8/1978 | Giannini et al. | 526/124 |

FOREIGN PATENT DOCUMENTS

| 2137872 | 2/1972 | Fed. Rep. of Germany | 526/125 |
| 2230672 | 12/1972 | Fed. Rep. of Germany | 526/125 |
| 2504036 | 8/1975 | Fed. Rep. of Germany | 526/125 |
| 2644440 | 4/1977 | Fed. Rep. of Germany | 526/125 |
| 2455415 | 5/1975 | Fed. Rep. of Germany | 526/124 |
| 5044273 | 4/1975 | Japan | 526/125 |

OTHER PUBLICATIONS

U.S. 4,107,414 Corresponds to German 2,230,672 of record.

Primary Examiner—Edward J. Smith
Attorney, Agent, or Firm—Robert E. Burns; Emmanuel J. Lobato; Bruce L. Adams

[57] ABSTRACT

A process for producing olefin polymers comprising contacting an ethylenically unsaturated monomer comprising at least one olefin monomer with a catalyst system comprising a combination of a catalyst component I and a catalyst component II as described hereunder:

Catalyst component I

A solid product obtained by contacting the following constituents (a), (b) and (c) or (a), (b), (c) and (d) together:

(a) A solid reaction product of a magnesium compound containing a hydroxyl group attached to magnesium and an organoaluminum compound represented by the formula $R_nAlX_{3-n}$ wherein R represents a hydrocarbon residue having from 1 to 20 carbon atoms, X represents a halogen atom and n represents a number of greater than zero but not greater than 1.5, i.e. $0 < n \leq 1.5$, which solid reaction product may, if desired, be further reacted with a siloxane compound;

(b) An electron donor;

(c) A halogen compound of titanium; and (d) At least one compound or element selected from the group consisting of:
 (i) A halogen compound of an element of Groups IIIb through VIb of the periodic table;
 (ii) A halogen;
 (iii) An interhalogen; and
 (iv) A siloxane compound.

Catalyst component II

An organometallic compound of a metal of Groups I through III of the periodic table.

8 Claims, No Drawings

PROCESS FOR PRODUCING OLEFIN POLYMERS

BACKGROUND OF THE INVENTION

Field of art

The present invention relates to a process for producing olefin polymers by using so-called Ziegler-Natta or Ziegler-type catalysts. More specifically, it is concerned with a process for polymerizing olefins in which the catalyst used is unique.

In accordance with the present invention, there is provided a novel Ziegler-type catalyst or, more concretely, the transition metal catalyst component thereof. The catalyst has high activity, and the α-olefin polymers, particularly those having at least 3 carbon atoms in the α-olefin, obtained by the use of the catalyst has high stereospecific property.

Catalyst systems consisting of a combination of a compound of a transition metal of Groups IV through VI of the periodic table and an organometal compound of a metal of Groups I through III of the same table which are a polymerization catalyst for the polymerization of olefins are well known as a so-called Ziegler-type catalyst. Among these, a combination of titanium tetrachloride and triethylaluminum or titanium trichloride and diethylaluminum chloride is a typical example.

With regard to catalytic performance, a catalyst capable of providing the possible greatest yield of a polymer per unit weight of a catalyst used and, in particular, in the case of the polymerization of α-olefins having at least 3 carbon atoms in the α-olefin, the possible largest quantity of a stereospecific polymer can be evaluated to be highly effective, because a reduction in the quantity of a catalyst residue in a polymer owing to the high activity of the catalyst makes it possible to simplify or eliminate the catalyst removing process in the polymerization process. Also, in the case of the polymerization of α-olefins having at least 3 carbon atoms, the extraction process of atactic polymers deficient of pratical value can be simplified or eliminated if the resultant polymer has a high content of stereospecific polymer. Simplification or elimination of the catalyst removing process and the extraction process of atactic polymers leads to not only a reduction in the cost of polymer production due to the economization of polymer production process, but also both a reduction in resources and prevention of environmental pollution due to the decreased quantities or removal of various agents and solvents for the catalyst removal and the extraction of atactic polymers.

Prior art

From these standpoints, an improvement in catalysts for the polymerization of olefins has been actively attempted. A typical approach is to have a compound of a transition metal deposited on a solid support.

Anhydrous magnesium chloride is one of the supports providing highly active catalysts which have been preferentially used in Ziegler-type catalysts. See, British Pat. Nos. 1,292,853 and 1,286,867 and Japanese Patent Laid-open Publication No. 7260/71. Also, in order to enhance a content of a carried transition metal compound in a solid catalyst and a stereospecific polymer content in the resulting polymer, a process for treating the anhydrous magnesium chloride with an electron donor or a process for contacting the anhydrous magnesium chloride with a complex of a compound of a transition metal and an electron donor has been proposed. See, British Pat. No. 1,335,887, Japanese Patent Laid-open Publication Nos. 16986/73, 16987/73, 16988/73 and 105385/75 and Japanese Patent Publication No. 32270/75.

On the other hand, magnesium compounds containing a hydroxyl group, such as, for example, magnesium hydroxide or magnesium hydroxychloride, have been frequently used as a support. See, Japanese Patent Publication Nos. 13050/68, and 42136/72 and Japanese Patent Laid-open Publication No. 44273/75. Alternatively, it is known to use as the carrier hydroxyl-containing magnesium compounds treated with an organometal compound or alumium chloride (see, Japanese Patent Publication Nos. 43435/72 and 10845/72) or hydrated magnesium chloride treated with an organometal compound (see, Japanese Patent Laid-open Publication No. 34783/72).

However, it appears that, when these hydroxyl-containing magnesium compounds are used as a carrier or a starting material for a carrier, a catalyst has not yet been developed which is not only highly active with regard to the polymerization of olefins, particularly those having at least 3 carbon atoms, but also provides a polymer having high stereospecific property.

SUMMARY OF THE INVENTION

An object of the present invention is to provide a means for production in a high yield of highly stereospecific olefin polymers over a carried Ziegler-type catalyst.

Another object is to provide a carried Ziegler-type catalyst for production in a high yield of olefin polymers endowed with a high stereospecificity, the carrier on which a transition metal component of the catalyst is supported being based on a hydroxyl-containing magnesium compound.

Further objects will be apparent from the following description.

According to the invention, in one aspect thereof, there is provided a process for producing olefin polymers characterized in that an ethylenically unsaturated monomer comprising at least one olefin monomer is contacted with a catalyst system comprising a combination of a catalyst component IA and a catalyst component II as described hereunder.

Catalyst component IA

A solid product obtained by contacting the following constituents (a), (b) and (c) together:
(a) A solid reaction product of a magnesium compound containing a hydroxyl group attached to magnesium and an organoaluminum compound represented by the formula $R_n AlX_{3-n}$ wherein R represents a hydrocarbon residue having from 1 to 20 carbon atoms, X represents a halogen atom and n represents a number of greater than zero but not greater than 1.5, i.e. $0 < n \leq 1.5$;
(b) An electron donor; and
(c) A halogen compound of titanium.

Catalyst component II

An organometal compound of a metal of Groups I through III of the periodic table.

Also, another process of producing olefin polymers in this aspect of the present invention is characterized in that an ethylenically unsaturated monomer comprising at least one olefin monomer is contacted with a catalyst system comprising a combination of a catalyst component IB and a catalyst component II as described hereunder.

Catalyst component IB

A solid product obtained by contacting the following (a), (b), (c) and (d) together:

(a) A solid reaction product of a magnesium compound containing a hydroxyl group attached to magnesium and an organoaluminum compound represented by the formula $R_nAlX_{3-n}$ wherein R represents a hydrocarbon residue having from 1 to 20 carbon atoms, X represents a halogen atom and n represents a number of greater than zero but not greater than 1.5, i.e. $0 < n \leq 1.5$;

(b) An electron donor;

(c) A halogen compound of titanium; and (d) At least one member selected from the group consisting of:

(i) A halogen compound of an element of Groups IVb through VIb of the periodic table;

(ii) A halogen; and (iii) An interhalogen.

Catalyst component II

An organometal compound of a metal of Groups I through III of the periodic table.

According to another aspect of the present invention there is provided a process for producing olefin polymers characterized in that an ethylenically unsaturated monomer comprising at least one olefin monomer is contacted with a catalyst system comprising a combination of a catalyst component IA and a catalyst component II as described hereunder.

Catalyst component IA

A solid product obtained by contacting the following constituents (a), (b) and (c) together:

(a) A solid product obtained by reacting (1) a solid reaction product obtained by reaction between a magnesium compound containing a hydroxyl group attached to magnesium and an organoaluminum compound represented by the formula $R_nAlX_{3-n}$ wherein R represents a hydrocarbon residue having from 1 to 20 carbon atoms, X represents a halogen atom and n represents a number of greater than zero but not greater than 1.5, i.e. $0 < n \leq 1.5$, with (2) a siloxane compound;

(b) An electron donor; and (c) A halogen compound of titanium.

Catalyst component II

An organometal compound of a metal of Groups I through III of the periodic table and/or an adduct or reaction product of an organometal compound of a metal of Groups I through III of the periodic table and an electron donor.

Also, another process of producing olefin polymers in this aspect of the present invention is characterized in that an ethylenically unsaturated monomer comprising at least one olefin monomer is contacted with a catalyst system comprising a combination of a catalyst component IB and a catalyst component II as described hereunder.

Catalyst component IB

A solid product obtained by contacting the following constituents (a), (b), (c) and (d):

(a) A solid product obtained by reacting (1) a solid reaction product of a magnesium compound containing a hydroxyl group attached to magnesium and an organoaluminum compound represented by the formula $R_nAlX_{3-n}$ wherein R represents a hydrocarbon residue having from 1 to 20 carbon atoms, X represents a halogen atom and n represents a number of greater than zero but not greater than 1.5, i.e. $0 < n \leq 1.5$, with (2) a siloxane compound;

(b) An electron donor;

(c) A halogen compound of titanium; and (d) At least one member selected from the group consisting of:

(i) A halogen compound of an element of Groups IIIb through VIb of the periodic table;

(ii) A halogen;

(iii) An interhalogen;

(iv) A siloxane compound.

Catalyst component II

An organometal compound of a metal of Groups I through III of the periodic table and/or an adduct or reaction product of an organometal compound of a metal of Groups I through III of the periodic table and an electron donor.

DETAILED DESCRIPTION

As stated above, in the Ziegler-type catalyst according to the present invention, the transition metal component comprises a combination of multiple constituents [(a), (b) and (c), and, optionally, (d)], and one constituent (a) of these is a solid reaction product of a magnesium compound containing a hydroxyl group and a particular and limited organoaluminum compound, which product is, optionally, further allowed to react with a siloxane compound. The constituent (a) mainly functions as a carrier for the transition metal component, although it is not intended that the constituent (a) does not function otherwise. Also, the reducing component of the Ziegler-type catalyst consists essentially of an organometal compound or it is an adduct or reaction product of an organometal compound and an electron donor.

Catalyst component IA or IB

1. A magnesium compound-organoaluminum compound reaction product (1) and a reaction product of the product (1) and a siloxane compound (2) (constituent a)

(1) A magnesium compound-organoaluminum compound reaction product (1) A magnesium compound The term "magnesium compound containing a hydroxyl group" as used herein refers to a magnesium compound containing at least one hydroxyl group attached directly to a magnesium atom. Examples of such a magnesium compound are magnesium hydroxide, magnesium hydroxyhalides and compositions consisting mainly of an intermixture of these materials. Among these, magnesium hydroxyhalides represented by the formula Mg(OH)X wherein X represents a halogen are preferable, and magnesium hydroxychloride is particularly preferable. Preferably, these magnesium compounds are substantially anhydrous, but they can contain a minor quantity of water as long as it does not have an adverse effect on the performance of the resulting catalyst.

The magnesium hydroxide may be commercially available. The magnesium hydroxychloride may be prepared by various methods, for example, by hydrolysis of a Grignard reagent or magnesium alkoxychloride (J. Am. Pharm. A., 27, 303 (1938)), or thermal decomposition of hydrated magnesium chloride.

(2) An organoaluminum compound

The organoaluminum compound to be reacted with the above described magnesium compound is represented by the formula $R_nAlX_{3-n}$ wherein R represents a hydrocarbon residue having from 1 to 20 carbon atoms, ordinarily 1 to 12 carbon atoms, X represents a halogen atom and n is any positive number of greater than zero but not greater than 1.5, i.e. $0 < n \leq 1.5$, preferably $0.1 < n \leq 1.5$, more preferably $0.5 < n < 1.5$. It is to be noted that when the number n is within the range of $1.5 < n \leq 3$, the advantages of the present invention cannot be enjoyed (as fully described hereinafter). The X represents a halogen atom selected from the group consisting of fluorine, chlorine, bromine and iodine, and chlorine is preferably used.

Preferred examples of these organoaluminum compounds include:
  (i) Alkyl- or aryl-aluminum dichlorides such as methylaluminum dichloride, ethylaluminum dichloride, n-butylaluminum dichloride, i-butylaluminum dichloride, n-dodecylaluminum dichloride, and phenylaluminum dichloride.
  (ii) Alkyl- or aryl-aluminum sesquichlorides such as methylaluminum sesquichloride, ethylaluminum sesquichloride, n-propylaluminum sesquichloride, i-butylaluminum sesquichloride, n-octylaluminum sesquichloride, n-dodecylaluminum sesquichloride, and phenylaluminum sesquichloride.
  (iii) Organoaluminum compounds which are reaction products of a trialkyl- or triaryl-aluminum, or a dialkyl- or diaryl-aluminum chloride and aluminum chloride and have a value n represented by $0 < n \leq 1.5$, preferably $0.5 < n < 1.5$.
  (iv) Reaction products of an alkyl- or aryl-aluminum sesquichloride and an alkyl- or aryl-aluminum dichloride or aluminum chloride.

Among these, the ethylaluminum dichloride is particularly preferable.

(3) Reaction of a magnesium compound and an organoaluminum compound

The reaction of the above described magnesium compound and organoaluminum compound can be carried out in the presence or absence of a solvent. The reaction is preferably carried out in the presence of a solvent for the benefit of control of the reaction temperature and promotion of homogeneous reaction.

Although any solvent which has no adverse effect on the performance of the catalyst may be used as the solvent, hydrocarbons having from 5 to 30, particularly from 5 to 15 carbon atoms, are preferably used. Examples of such a solvent are saturated aliphatic hydrocarbons such as pentane, hexane, heptane, decane and dodecane, alicyclic saturated hydrocarbons such as cyclohexane and methylcyclohexane, aromatic hydrocarbons such as benzene, toluene, xylene and naphthalene and mixtures thereof, kerosene and light oil. It is preferable that these solvents are fully dehydrated before use.

The ratio in quantity of the magnesium compound to the organoaluminum compound is such that the organoaluminum compound is in the range of ordinarily 0.1 to 50 moles, preferably 0.3 to 20 moles, and more preferably 0.5 to 10 moles, per 1 mole of the magnesium compound. If the quantity of the organoaluminum compound is too small, it is difficult to enjoy the advantages of the present invention satisfactorily. On the other hand, too much of the organoaluminum compound is not only uneconomical, but also makes it complicated to handle the catalyst. Further, any particularly remarkable advantage could not be obtained.

In the reaction operation, when the organoaluminum compound represented by the formula $R_nAlX_{3-n}$ has a value n within the range of $1 < n \leq 1.5$, it is preferable to use reaction conditions stronger or severer than those used in the case of $0 < n \leq 1$. For example, when n equals to 1.5, the magnesium compound must be severely pulverized by mechanical means such as vibration mill before it is introduced into the reaction system, and the pulverized magnesium compound is then reacted with the organoaluminum compound in hexane at the reflux temperature of hexane for several hours in such a manner that the atomic ratio of the Al in the organoaluminum compound to the Mg in the magnesium compound, Al/Mg, is no less than 3.0, i.e. $\geq 3.0$, whereupon a product capable of providing sufficient catalytic performance can be obtained. It is to be noted that if the quantity of the organoaluminum compound used is too small, or the magnesium compound is not pre-pulverized before being used or the reaction temperature is too low, a catalyst component prepared from the product thus produced does not always exhibit sufficient catalytic performance.

The reaction temperature is not critical as long as the reaction between the magnesium compound and the organoaluminum compound proceeds thereat. The reaction is preferably carried out at a temperature of ordinarily 0° to 200° C., and particularly 30° to 150° C.

The reaction time is not critical so far as the reaction between the magnesium compound and the organoaluminum compound is completed. Ordinarily, it is in the range of several minutes to several hours. Preferably, it is in the range of 30 minutes to 10 hours.

The reaction product is a compound or composition comprising aluminum, magnesium, a halogen and oxygen of unknown structure.

In some cases, a part of a certain type of the solvents used may combine with the reaction product so strongly that the combined solvent cannot be removed by washing or vacuum drying. However, such a product may also be used.

(4) Criticality of the type of an organoaluminum compound

It could not be predicted from known facts that in accordance with the present invention, a catalyst carrier material for the polymerization of olefins which has very excellent performance can be obtained by treating a magnesium compound containing a hydroxyl group with the particular organoaluminum compound of the above described formula wherein n is restricted to $0 < n \leq 1.5$.

For example, a product obtained by treating magnesium hydroxychloride with butyl magnesium chloride, triethylaluminum (n=3) or diethylaluminum chloride (n=2) can only provide a catalyst of very poor performance.

(2) Reaction of a magnesium compound-an organoaluminum compound reaction product (1) and a siloxane compound (2)

In one embodiment of the present invention, a solid carrier containing magnesium is a contact product of a magnesium compound, an organoaluminum compound and a siloxane compound.

(1) A siloxane compound

The siloxane compound usable for the present invention is a linear or cyclic organosiloxane compound or an organosiloxane compound of a three-dimensional structure, which compounds having a backbone of the interbond between silicon and oxygen represented as follows:

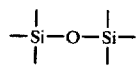

These siloxane compounds are a linear or cyclic siloxane polymer essentially represented by the following formulae. It is practically advantageous that these polymers themselves are liquids having a low viscosity or they are soluble in an aliphatic or aromatic hydrocarbon or a halogenated hydrocarbon.

(i) A liner siloxane polymer represented by the following formula:

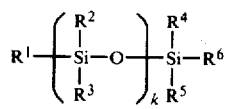

wherein $R^1$ and $R^6$ represent an atom or group selected from the group consisting of a hydrogen atom, a halogen atom, a hydrocarbon residue ordinarily having from 1 to 12 carbon atoms, and an alkoxy or aryloxy group ordinarily having from 1 to 12 carbon atoms, and $R^2$, $R^3$, $R^4$ and $R^5$ represent hydrogen or a hydrocarbon residue ordinarily having from 1 to 12 carbon atoms. $R^1$ to $R^6$ may be the same or different, but a case where all of them are hydrogen atoms is excluded. k represents an integer of 1 or more, ordinarily up to 10,000, particularly 1 to 5,000.

(ii) A cyclic siloxane polymer represented by the following formula:

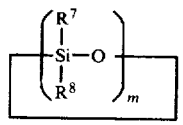

wherein $R^7$ and $R^8$ represent a hydrogen atom or a hydrocarbon residue ordinarily having from 1 to 12 carbon atoms and they may be the same or different, but the case where all of $R^7$ and $R^8$ are hydrogen atoms is excluded. m represents an integer of, ordinarily, not greater than 10,000, and particularly 3 to 5,000.

The siloxane polymer usable for the present invention may be from a single polymer having a low viscosity of several centistokes as measured at a temperature of 20° C. to a pasty or greasy polymer having a viscosity of 1,000,000 centistokes or a solid polymer. All of these polymers exhibit similar effects, but a siloxane polymer having such a degree of polymerization that its viscosity is in the range of 0.5 to 10,000 centistokes is preferable.

The solid siloxane polymer includes, in addition to those represented by the formulae (i) and (ii), a polymer essentially represented by the formula (i) or (ii) which is partially cross-linked by the following group:

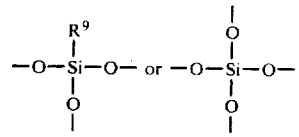

wherein $R^9$ represents a hydrogen atom or a hydrocarbon residue having from 1 to 12 carbon atoms.

Examples of the siloxane polymer which may be generally used in the present invention are alkylsiloxane polymers such as lower polymers, for example, hexamethyldisiloxane, hexamethylcyclotrisiloxane, octamethyltrisiloxane, octamethylcyclotetrasiloxane, octaethylcyclotetrasiloxane, decamethyltetrasiloxane and dodecamethylcyclohexasiloxane; dimethylpolysiloxane; ethylpolysiloxane and methylpolysiloxane polymers; arylsiloxane polymers such as hexaphenyldisiloxane, hexaphenylcyclotrisiloxane, octaphenylcyclotetrasiloxane and diphenylpolysiloxane; alkylarylsiloxane polymers such as diphenyloctamethyltetrasiloxane, pentamethyl-1,3,5-triphenyltrisiloxane, 1,3,5-trimethyl-1,3,5-triphenylcyclotrisiloxane, and methylphenylpolysiloxane; alkylhydrogensiloxane polymers such as siloxane polymers containing a hydrocarbon residue and hydrogen as a substituent, for example, 3-hydroheptamethyltrisiloxane, 3,5,7-trihydrononamethylpentasiloxane, 1,3,5-trimethyl-1,3,5-trihydrocyclotrisiloxane, and 1,3,5,7-tetramethyl1,3,5,7-tetrahydrocyclotetrasiloxane.

Other examples of the siloxane polymer are haloalkylsiloxane (or haloarylsiloxane) polymers such as chloromethylpolysiloxane, ethylparachlorophenylpolysiloxane, and methylparadimethylaminophenylcyclopolysiloxane; and halosiloxane polymers such as decamethyltetrachlorohexasiloxane and phenylfluorocyclopolysiloxane.

Particularly, these siloxane compounds are generally commercially available as silicone oils, silicone greases, silicone resins or silicone varnishes having various viscosities.

(2) Reaction

The reaction of the above described siloxane and the reaction product of the above described magnesium compound and the above described organoaluminum compound is carried out at a ratio of siloxane to produce such that the quantity of the siloxane compound is in the range of ordinarily 0.1 to 1000 g, preferably no less than 1 g, more preferably no less than 5 g, per 100 g of the magnesium compound- organoaluminum compound reaction product. The upper limit of the siloxane compound is not critical, but, ordinarily, the quantity of not greater than 1000 g is satisfactory to achieve the purpose of the present invention. The symbol "g" stands for "gram".

The reaction may be carried out in various forms. For example, it is carried out in the presence or absence of a solvent at a temperature of room temperature to 200° C. for several minutes to 10 hours while stirring, or it is carried out by mechanical co-pulverization by means of, for example, a vibration mill. When a solvent is used, hydrocarbons or halogenated hydrocarbons having from ordinarily 5 to 12 carbon atoms are preferred solvents.

The solid product (constituent (a)) obtained by this reaction is a compound or composition consisting of magnesium, aluminum, a halogen, silicon and oxygen of unknown structure. One of the features of the product consists in a high surface area of, ordinarily, no less than 20 m²/g, and in some instance, about 140 m²/g.

Another feature of the product consists in the fact that when the constituent (a) is used in the preparation of a carrier for a catalyst for the polymerization of α-olefins, the resulting catalyst composite generally exhibits a higher level of polymerization activity and of the stereospecific property of the resultant polymer than catalysts where a carrier which has not been treated with the siloxane compound.

The solid catalyst compound IA or IB can be prepared by contacting the constituent (a), an electron donor (constituent (b)) and a halogen compound of titanium (constituent (c)), and further, if desired, a halogen compound of an element of Groups IIIb to VIb of the periodic table, a halogen or an interhalogen or a siloxane compound (constituent (d)) with each other.

2. An electron donor (constituent (b))

The constituent (b) is at least one of electron donative compounds containing at least one atom selected from the group consisting of oxygen, sulfur, nitrogen and phosphorus and it is a compound such as an alcohol, an ether, an ester, a ketone, an aldehyde, a carboxylic acid, and an acid halide. Examples of such a compound are as follows:

(i) Alcohols (particularly, mono- and dihydric alcohols) having from about 1 to 20 carbon atoms such as methanol, ethanol, butanols, octanols, ethylene glycol, and ethylene glycol monobutyl ether;

(ii) Phenols (particularly, mono- and dihydric phenols) having from about 6 to 20 carbon atoms such as phenol, naphthol and cresol;

(iii) Esters of a carboxylic acid (particularly, monocarboxylic acid) having from about 2 to 20 carbon atoms and an alcohol or a phenol selected from the above described alcohols or phenols (particularly, monohydric alcohols or phenols) having from about 1 to 20 carbon atoms such as aliphatic carboxylic acid esters, for example, methyl acrylate, ethyl acrylate and methyl methacrylate and aromatic carboxylic acid esters, for example, methyl benzoate, ethyl benzoate, isopropyl benzoate, ethyl toluylate, ethyl anisate, and allyl acetate;

(iv) Ketones (particularly, monoketones) having from about 3 to 20 carbon atoms such as acetone, methyl ethyl ketone, acetophenone and benzophenone;

(v) Aldehydes (particularly, monoaldehydes) having from about 1 to 20 carbon atoms such as formaldehyde, acetaldehyde and benzaldehyde;

(vi) Carboxylic acids (particularly, monocarboxylic acids) having from about 2 to 20 carbon atoms such as acetic acid, benzoic acid, acrylic acid and methacrylic acid;

(vii) Acid anhydrides (particularly, monocarboxylic anhydrides) having from about 4 to 40 carbon atoms such as acetic anhydride and benzoic anhydride;

(viii) Acid (particularly, monocarboxylic acids) halides (particularly chlorides) having about 2 to 20 carbon atoms such as acetyl chloride, benzoyl chloride, and toluyloyl chloride;

(ix) Ethers (particularly, mono- and diethers) having from about 2 to 25 carbon atoms such as diethyl ether, dibutyl ethers, diisoamyl ether, dioctyl ethers, tetrahydrofuran, tetrahydropyran, furan, anisole, phenetole, diphenyl ether, ethylene glycol dimethyl ether and diethylene glycol dibutyl ethers;

(x) Amines (particularly, mono- and diamines) having from about 1 to 30 carbon atoms such as trimethylamine, diethylamine, aniline, N,N-dimethylaniline, and N,N,N', N'-tetramethylethylenediamine;

(xi) Acid amides (particularly, monoacid amides) having from about 3 to 30 carbon atoms such as N,N-methylformamide, benzoic acid amide and N,N-dimethyl benzoic acid amide;

(xii) Nitriles (particularly, mononitriles) having from about 2 to 20 carbon atoms such as acetonitrile and benzonitrile;

(xiii) Isocyanates (particularly, monoisocyanates) having from about 2 to 20 carbon atoms such as phenyl isocyanate;

(xiv) Ureas (particularly, urea, lower alkyl and alkylene ureas) having from about 1 to 30 carbon atoms such as urea, N,N'-dimethylurea and tetramethylurea;

(xv) Sulfonic acids (particularly, monosulfonic acids) having from about 1 to 20 carbon atoms and esters thereof such as benzenesulfonic acid and p-toluenesulfonic acid;

(xvi) Carbon disulfide;

(xvii) Sulfides having from about 2 to 30 carbon atoms such as dimethyl sulfide, dibutyl sulfide, diphenyl sulfide and phenylethyl sulfide;

(xviii) Mercaptans having from about 1 to 20 carbon atoms such as ethyl mercaptan and butyl mercaptan;

(xix) Thiophenols having from about 6 to 20 carbon atoms such as thiophenols and thionaphthols;

(xx) Thiocarboxylic acid esters having from about 3 to 30 carbon atoms such as ethyl thiobenzoate and ethyl thioacetate;

(xxi) Sulfoxides having from about 2 to 30 carbon atoms such as dimethyl sulfoxide and diphenyl sulfoxide;

(xxii) Phosphines having from 3 to 30 carbon atoms such as triphenylphosphine, triethylphosphine, diphenylchlorophosphine and phenyldichlorophosphine;

(xxiii) Phosphine oxides and phosphorus oxyhalides having from about 3 to 30 carbon atoms such as triethylphosphine oxide, triphenylphosphine oxide and ethyldichlorophosphine oxide;

(xxiv) Phosphates having from 3 to 30 carbon atoms such as triethyl phosphate and triphenyl phosphate;

(xxv) Phosphites having from 3 to 30 carbon atoms such as triethyl phosphite and triphenyl phosphite; and (xxvi) Phosphoric acid amides having from 0 to 30 carbon atoms such as phosphoric acid amide and hexamethyl phosphoric acid triamide.

These electron donative compounds may also be used as a mixture of two or more of the above described compounds.

Among these electron donative compounds, the carboxylic acid esters, particularly aromatic carboxylic acid esters, above all, lower alkyl esters of benzoic acid, toluylic acid and anisic acid, and α,β-unsaturated carboxylic acid esters, particularly, lower alkyl esters of acrylic acid and methacrylic acid are preferably used in the preparation of a catalyst capable of providing a polymer with high stereospecific property in the polymerization of α-olefins having at least 3 carbon atoms.

3. A halogen compound of titanium (comstituent (c))

The constituent (c) is represented by the formula $TiR_pX_qY_r$ wherein R represents a hydrocarbon residue having from ordinarily 1 to 20 carbon atoms, X represents a halogen atom selected from the group consisting of fluorine, chlorine, bromine and iodine, particularly, chlorine being preferable, Y represents an oxygen atom or an alkoxy group having from 1 to 20 carbon atoms, an aryloxy group or a siloxy group, p and r are each zero or a positive number, q is a positive number equal to or greater than 1, and p, q and r are numbers satisfying the following requirements:

$$p+q+r = \text{the valence of titanium}$$

and if the Y is an oxygen atom, $p+q+2r=$ the valence of titanium.

Examples of these titanium compound are titanium halides such as titanium tetrachloride, titanium tetrabromide, titanium trichloride, and titanium dichloride, organotitanium halides such as dicyclopentadienyldichlorotitanium, cyclopentadienyltrichlorotitanium, and dicyclopentadienyldibromotitanium, alkoxy titanium halides such as n-butoxytitanium trichloride, and di-n-butoxytitanium dichloride and trimethylsiloxytitanium trichloride.

Among these, the titanium tetrachloride and titanium trichloride are particularly preferable for the purpose of producing a crystalline stereospecific polymer.

4. A constituent (d)

The constituent (d) is at least one compound or element selected from the group consisting of:
(i) Compounds having at least one bond between a halogen and an element of Groups IIIb to VIb of the periodic table [see, the back cover of "Handbook for Organometals" (Yukikinzoku Handbook), published by Asakura Shoten, Apr. 5, 1967];
(ii) Halogens;
(iii) Compounds between different halogens, i.e. interhalogens;
(iv) Siloxane compounds.

Examples of the constituent (d) are as follows:
(a) Compounds having a Group IIIb element of the periodic table-halogen bond such as boron trichloride, aluminum chloride, gallium chloride; derivatives of these chlorides in which part of the chlorines is substituted with an alkoxy group having from ordinarily 1 to 15 carbon atoms, an aryloxy group or a siloxy group, for example, dichloroethoxyaluminum, dichloroethoxygallium, and trimethylsiloxyaluminum dichloride, and derivatives of these compounds in which part or whole of the chlorines are substituted with the other halogens.
(b) Compounds having a carbon-halogen bond such as carbon tetrachloride, chloroform, butyl chloride, 1,2-dichloroethane, benzoyl chloride and benzyl iodide.
(c) Compounds having a silicon-halogen bond such as silicon tetrachloride, methyltrichlorosilane, and methoxytrichlorosilane.
(d) Compounds having a germanium-halogen bond such as germanium tetrachloride, trimethylchlorogermane, and methoxytrichlorogermane.
(e) Compounds having a tin-halogen bond such as tin tetrachloride, butyltintrichloride, dibutyltindichloride and tin dichloride.
(f) Compounds having a nitrogen-halogen bond such as N-chloromaleimide, N-iodoacetanilide and N-iodophthalimide.
(g) Compounds having a phosphorus-halogen bond such as phosphorus pentachloride, phosphorus trichloride, phenyldichlorophosphine and ethyldichlorophosphine oxide.
(h) Compounds having an antimony, bismuth, sulfur, tellurium or selenium-halogen bond such as antimony pentachloride, antimony trichloride, sulfur monochloride, sulfur dichloride, thionylchloride, selenium tetrachloride, tellurium tetrachloride and bismuth trichloride.
(i) Chlorine, bromine and iodine.
(j) Interhalogens such as iodine monochloride and iodine trichloride.
(k) The siloxane compounds described in the preparation of the constituent (a).

Among these, the compounds of items (a), (b), (c), (d), (h), (i), (j) and (k) are particularly preferable for the purpose of producing a crystalline stereospecific polymer.

5. Preparation of catalyst components IA and IB

The catalyst components IA and IB may be prepared by contacting the constituents (a) to (c) or (a) to (d) together. Examples of a preferred process for that purpose are as follows:
(1) A process in which the constituents (a) and (b) are contacted with each other, and the constituent (c) is then contacted with the contact product.
(2) A process in which the contact product between the constituents (b) and (c) is contacted with the constituent (a).
(3) A process in which the constituents (a) and (b) are contacted with each other and the constituents (b) and (c) are contacted with each other, and these contact products are then contacted with each other.
(4) A process according to (1) to (3) wherein the contact product between the constituents (a) and (d) is used instead of the constituent (a).
(5) A process in which the contact product between the three constituents (a), (b) and (d) is contacted with the constituent (c).
(6) A process in which the constituents (a) and (b) are contacted with each other, the contact product is then contacted with the constituent (d) and the resultant contact product is finally contacted with the constituent (c).
(7) A process in which the product obtained by the processes (1) to (3) or the process (5) is contacted with the constituent (d).
(8) A process in which the product obtained by simultaneously contacting the constituents (a), (b) and (d) with each other is contacted with the contact product between the constituents (b) and (c) and the resultant product is contacted with the constituent (d).
(9) A process in which the constituents (a), (b) and (c) and, if desired, the constituent (d) are simultaneously contacted with each other.

The process of the present invention in which the constituents (a), (b), and (c) or the constituents (a), (b), (c) and (d) are contacted with each other is not limited to the above described processes (1) to (9), but it includes any combination of these processes and any process readily thought of based on these processes. For example, a process in which the solid product obtained by any of the processes (1) to (9) is again contacted with the constituent (b) and a process in which the solid product obtained by any of the processes (1) to (9) is again treated with any of the processes of (1) to (9) are within the scope of the present invention. Among these, the processes (1), (4), (5), (6) and (7) are particularly preferable.

In the preparation of the catalyst components IA and IB, the constituents (a), (b) and (c) and the constituents (a), (b), (c) and (d) are used at a quantity ratio described hereunder. It is ordinary that the constituent (b) is used in a quantity of 0.01 to 10 moles, preferably 0.05 to 1.0 moles, more preferably, 0.05 to 0.5 moles, the constituent (c) is used in a quantity of about 0.001 to 1000 moles, ordinarily about 0.005 to 100 moles, and the constituent (d) is used in a quantity of 0.001 to 100 moles, preferably 0.01 to 10 moles (in the case of the siloxane compound, a gram atom calculated in terms of silicon), each of the above described numerical values being based on 100 g of the component (a).

Representative processes of the above described processes are described in more detail hereunder.

Process (1)

The constituents (a) and (b) may be contacted with each other by a process comprising mixing the constituents (a) and (b) in the presence or absence of an inert hydrocarbon such as hexane, heptane, benzene, toluene and cyclohexane or a halogenated hydrocarbon such as carbon tetrachloride and 1.2-dichloroethane or a process comprising mechanically contacting the constituents (a) and (b) by means of a rotary ball mill, a vibration ball mill or an impact mill. The latter process is preferable. Although the temperature at which the constituents (a) and (b) are contacted with each other is not particularly critical, it is in the range of ordinarily 0° to 300° C., preferably room temperature to 200° C. The contact time is not critical. However, when a mechanical contact by means of a vibration ball mill is carried out, the contact time is in the range of ordinarily several minutes to several hundred hours, preferably 30 minutes to 200 hours, particularly preferably 1 to 100 hours.

The contact process between the contact product of the constituents (a) and (b) and the constituent (c) can use the same process as used in the contact process between the constituents (a) and (b). When the constituent (c) is a liquid, it is advisable that the contact product of the constituents (a) and (b) is mixed with the constituent (c) in the presence or absence of an inert solvent and the mixture is retained at a temperature of ordinarily 0° to 200° C., preferably room temperature to 150° C. for about 1 minute to 100 hours, ordinarily 10 minutes to 10 hours. Even if the constituent (c) is a solid, when the solid is soluble in an inert solvent, the constituent (c) after being dissolved in the solvent can be handled in the same manner as that described in the case where the constituent (c) is a liquid. It is ordinary that the catalyst component IA thus prepared is completely washed with an inert solvent.

Process (2)

In general, the constituent (c) has a great tendency to form a complex with the constituent (b). This process is one comprising contacting the formed complex with the constituent (a). When the constituents (b) and (c) are a liquid or soluble in an inert solvent, mere mixing of the constituent (b) with the constituent (c) in the presence or absence of an inert solvent often results in a complex. The complex thus formed after being purified or not purified is contacted with the constituent (a). When the constituent (c) is a solid and insoluble in an inert solvent, a complex may be formed by mechanically co-pulverizing or co-milling the constituent (c) together with the constituent (b).

In this process, it is preferred that the mole ratio of the constituent (b) to the constituent (c), i.e. b/c, is in the range of ordinarily 0.01 to 50, preferably 0.1 to 10.

The contact of the complex formed by contact between the constituent (b) and the constituent (c) with the constituent (a) may be carried out according to the process described in the above described process (1).

It is preferable that the quantity ratio of the contact product between the constituent (b) and the constituent (c) to the constituent (a) is such that the constituent (c) contained in the contact product between the constituents (b) and (c) is in the range of 0.001 to 1.0 mole, preferably 0.005 to 0.5 mole, more preferably 0.01 to 0.2 mole, based on 100 g of the constituent (a).

Process (3)

A process by which the constituents (a) and (b) are contacted with each other and a process by which the constituents (b) and (c) are contacted with each other are not essentially different from the processes described in the processes (1) and (2), respectively. Also, the contact of the contact product between the constituents (a) and (b) with the contact product between the constituents (b) and (c) can be achieved by a process similar to the process (2), except that the contact product between the constituents (a) and (b) is used instead of the constituent (a).

The constituent (b) used in the contact between the constituents (a) and (b) and the constituent (b) used in the contact between the constituents (b) and (c) may be the same or different compound.

The quantity ratio of the constituent (a) to the constituent (b) in the contact between the constituents (a) and (b) and the quantity ratio of the constituent (b) to the constituent (c) in the contact between the constituents (b) and (c) are the same as described in the processes (1) and (2), respectively. However, it is desirable that the total quantity of the constituent (b) contained in the solid catalyst compound IA or IB is in the range of 0.01 to 10 moles, preferably 0.05 to 1.0 mole, more preferably 0.08 to 0.5 mole, based on 100 g of the constituent (a). Also, it is desirable that the mole ratio of the total quantity of the constituent (b) and the constituent (c) which are contained in the solid catalyst component IA or IB, i.e. b/c, is in the range of 0.01 to 50, preferably 0.1 to 10.

Process (4)

The contact between the constituents (a) and (d) may be carried out by stirring or mechanically copulverizing or comilling by means of a vibration mill the constituent (a) and 0.001 to 100 moles, preferably 0.01 to 10 moles of the constituent (d) per 100 g of the constituent (a) in the presence or absence of an inert solvent. Too much of the compound of the constituent (d) may hinder the performance of the resulting catalyst depending upon the kind of the constituent (d) (for example, sulfur chlorides). Although the temperature at which the constituents (a) and (d) are contacted with each other is not particularly critical, it is ordinarily in the range of 0° to 300° C., preferably 20° to 200° C. The constituent (d) may be a compound of a single species, but mixtures of two or more types of compound may also be used.

The solid catalyst component IB is prepared according to the same process as described in the processes (1) to (3) except that the contact product between the constituent (a) and the constituent (d) is used instead of the constituent (a).

Process (5)

It is advisable that the contact between the three constituents (a), (b) and (c) is carried out by stirring these three constituents in an inert solvent or particularly by co-pulverizing or comilling them. The solid catalyst component IB is prepared in a process similar to the process (1) except that the contact product of these three constituents is used instead of the contact product between the constituents (a) and (b).

In this process, too much of the constituent (d) may hinder the performance of the resulting catalyst depending upon the kind of the constituent (d) (for example, sulfur chlorides). For the purpose of producing a high stereospecific polymer, it is particularly advisable that halides of aluminum, gallium, silicon, germanium, antimony and bismuth and siloxane compounds be used.

Process (6)

The contact product between the constituents (a) and (b) as described in the process (1) is stirred together with the constituent (d) in an inert solvent or mechanically co-pulverized or comilled with the constituent (d). The constituent (d) is used in a quantity of 0.001 to 100 moles, preferably 0.01 to 10 moles, based on 100 g of the constituent (a). A solid catalyst component IB is prepared in a process similar to the process (1) except that the contact product of these three constituents is used instead of the contact product between the constituents (a) and (b).

Process (7)

This process comprises further contacting the solid product obtained by the process (1) to (3) or the process (5) with the constituent (d). In this process, it is preferable that the solid product obtained by the processes (1) to (3) or the process (5) is contacted, in a dispersion thereof in a solvent such as n-hexane, n-heptane, benzene, toluene, xylene, carbon tetrachloride and 1,2-dichloroethane, with the constituent (d).

For the purpose of producing a high stereospecific polymer, it is preferred that halides of sulfur, selenium, tellurium, nitrogen, phosphorus and antimony, halogens, iodine monochloride, iodine trichloride and halogenated hydrocarbons are used as the constituent (d).

Catalyst component II

The solid catalyst component IA or IB when combined with an organometal compound of a metal of Group Ia, IIa or IIIb of the periodic table, viz. catalyst component II, forms an effective catalyst for the polymerization of olefins. It is preferable that an organometal compound of a Group IIIb metal, particularly aluminum, is used as the catalyst component II. Suitable organometal compounds of aluminum are those represented by the formula:

$R_a AlX_{3-a}$ wherein R represents a hydrocarbon residue ordinarily having from 1 to 20 carbon atoms, X represents a halogen atom or hydrogen atom and a is a number satisfying the inequality $2 \leq a \leq 3$. Examples of such an organoaluminum compound are as follows:

(i) Trihydrocarbylaluminums such as trimethylaluminum, triethylaluminum, triisobutylaluminum, triisoprenylaluminum, tri-n-octylaluminum, and tri-n-dodecylaluminum.

(ii) Dihydrocarbylaluminum hydrides such as dimethylaluminum hydride, diethylaluminum hydride, diisobutylaluminum hydride, and dihexylaluminum hydride.

(iii) Dihydrocarbylaluminum chlorides such as dimethylaluminum chloride, diethylaluminum chloride, diisobutylaluminum chloride and dioctylaluminum chloride.

The catalyst component II may comprise an adduct or reaction product of the above described organometal compound with an electron donor (which may be selected from the group fully described as the above described constituent (b)). In this case, the constituent (b) contained in the catalyst component II is ordinarily not greater than 1 mole per 1 mole of the organic metal compound.

In the preparation of the Ziegler-type catalyst of the present invention, the catalyst component II is used in a quantity of ordinarily 0.1 to 500 moles, preferably about 0.5 to 300 moles, based on 1 mole of the component (c) contained in the solid catalyst components IA or IB.

POLYMERIZATION OF OLEFINS

The catalyst according to the present invention can be used in the polymerization of α-olefins such as ethylene, propylene, butene-1, 4-methylpentene-1, and styrene, or in the copolymerization of two or more of α-olefins or an α-olefin with another copolymerizable monomer such as butadiene or isoprene.

The catalyst of the present invention is particularly suitable for the polymerization of propylene or the copolymerization of propylene and a small quantity (for example, not greater than 20% by weight, preferably not greater than 10% by weight, based on the propylene) of ethylene.

The polymerization may be carried out by a conventional method for the polymerization of olefins using a so-called Ziegler-Natta catalyst. For example, the catalyst of the present invention can be used in a slurry method comprising carrying out polymerization in an inert solvent at a temperature of room temperature to 200° C. under a pressure of atomspheric pressure to 100 atmospheres, a liquid phase method comprising carrying out polymerization in a solvent consisting of liquefied monomers or a gas phase method comprising carrying out polymerization in a substantially gaseous state of monomer without using a liquid solvent.

Also, the molecular weight of a polymer can be easily adjusted by adding during polymerization a conventional molecular weight controlling agent such as hydrogen organozinc compounds and halogenated hydrocarbons. For this purpose, the hydrogen is particularly preferably used.

Further, polymerization can be conducted in the presence of an electron donor. An electron donor is an electron donative compound containing at least one atom selected from the group consisting of oxygen, sulfur, nitrogen and phosphorus and it is a compound such as an alcohol, an ether, an ester, a ketone, an aldehyde, a carboxylic acid, and an acid halide.

The following are non-limitative examples.

EXAMPLE A1

(1) Preparation of a constituent (a)

1 Kg of magnesium chloride hexahydrate commercially available was treated with stirring in a mortar at a temperature of 180° C. for 8 hours. Then, the resulting material was treated in a stream of argon in an electric furnace at a temperature of 350° C. for 6 hours to obtain 365 g of magnesium hydroxychloride. The magnesium hydroxychloride was pulverized in a mortar. 300 g of the powder was placed in a four-neck flask within which was displaced with argon and 1.5 liter of n-hexane was then added thereto. Subsequently, 685 g of ethylaluminum dichloride (n=1) was added dropwise to the flask while stirring at room temperature. After the dropwise addition was complete, and upon gradual heating of the flask, violent reaction took place with the result of evolution of a large quantity of gas. This gas was found to be ethane by gas chromatography and mass spectrum analysis. When the evolution of the gas became moderate, the flask was further heated to the reflux temperature for 6 hours. The solid product was separated from the liquid phase and washed with n-hexane until no aluminum could be detected in the wash liquor. Finally, the solid product was dried under vacuum to obtain 295 g of white powders of the constituent (a). This product was analysed to contain 2.7% by weight of aluminum, 22.5% by weight of magnesium and 62.5% by weight of chlorine. Also, it had a specific surface area of 58 $m^2/g$ as measured by a BET method.

(2) Preparation of the catalyst component IA 20 g of the above described constituent (a) and 6 ml of ethyl benzoate [constituent (b)] were taken in a pot of a vibration mill which is made of stainless steel, has a 1.2 liter capacity, and contains an apparent volume of 1.1 liter of a stainless steel ball 12.7 mm in diameter, and these materials were co-pulverized for 12 hours under the conditions comprising an amplitude of vibration of 3.5 mm, a number of vibration of 24.2 Hz and an acceleration of 8.3 G. 5 g of the white co-pulverized product obtained was placed in a three-neck flask and it was slurried by adding 50 ml of n-hexane to the flask. After 5 ml of titanium tetrachloride [constituent (c)] was added dropwise to the flask, the content of the flask was refluxed for 2 hours. The solid product was separated from the liquid phase and washed ten times with 50 ml of n-hexane each time to obtain the solid catalyst component IA. This product was found to contain 1.44% by weight of titanium as measured by colorimetric analysis.

(3) Polymerization of propylene 20 mg of triethylaluminum (catalyst component II), 35 mg of the solid catalyst component IA and 800 ml of liquefied propylene were added to an autoclave of 1 liter capacity which was made of stainless steel, and the mixture was reacted together at a temperature of 70° C. for 1 hour. When the remaining propylene was purged at the end of that time and the autoclave was evacuated to obtain 243 g of a white polypropylene powder. The yield of this polypropylene corresponds to 485 kg per 1 g of a titanium atom (hereinafter abbreviated as yield on Ti) and 6.93 kg per 1 g of the solid catalyst component IA (hereinafter abbreviated as yield on catalyst). Also, when the obtained polypropylene was extracted with boiling n-heptane in a Soxhlet's extractor for 6 hours, the extraction residue (hereinafter abbreviated as I.I.) was 91.9%.

EXAMPLE A2

(1) Preparation of the catalyst component IA 60 g of a purple titanium trichloride composition, which was obtained by reducing titanium tetrachloride with diethylaluminum chloride and subjecting the reduced product to heat treatment at a temperature of 150° C. for 5 hours, was milled or pulverized together with 3.3 ml of titanium tetrachloride in a vibration mill for 24 hours. 10 g of the co-pulverized mixture was placed in a 300 ml three-neck flask to which 200 ml of 1,2-dichloroethane was added. Then, 19.4 ml of di-n-butyl ether was slowly added dropwise to the flask while stirring and the mixture was stirred at a temperature of 50° C. for 8 hours. Thus, a brown homogeneous solution was obtained. This homogeneous solution was found to contain 32.3 g of titanium trichloride per liter by colorimetric analysis. 12.4 ml of the titanium trichloride [constituent (c)] solution was diluted with 1,2-dichloroethane to 50 ml. The diluted solution was slowly dropped to 50 ml of a slurry of 5 g of the co-pulverized mixture of the constituent (a) obtained in item (2) of Example A1 and ethyl benzoate [constituent (b)] in 1,2-dichloroethane at a temperature of 50° C. and the resultant mixture was stirred at a temperature of 50° C. for 2 hours. The solid product was separated from the liquid phase and washed four times with 50 ml of 1,2-dichloroethane and five times with 50 ml of n-hexane and then dried under vacuum. The solid catalyst component IA contained a titanium content of 1.89% by weight.

(2) Polymerization of propylene

Polymerization of propylene was carried out according to the procedure set forth in item (3) of Example A1 except that 10 mg of triethylaluminum (catalyst component II) and 26.4 mg of the above described catalyst component IA were used. The yield of polypropylene was 217 g which corresponded to a yield on Ti of 434 kg and a yield on catalyst of 8.2 kg. I.I. was 90.2%.

EXAMPLE A3

(1) Preparation of a catalyst component IB 20 g of the constituent (a) obtained in item (1) of Example A1, 6 ml of ethyl benzoate [constituent (b)] and 3 ml of benzoyl chloride [constituent (d)] were co-pulverized in a vibration mill for 12 hours. A solid catalyst component IB was prepared by using 5 g of the co-pulverized product according to the same procedure as that described in item (2) of Example A1. The resulting solid catalyst component IB contained a titanium content of 0.95% by weight.

(2) Polymerization of propylene

Polymerization of propylene was carried out for 20 minutes according to the procedure set forth in item (3) of Example A1 except that 40 mg of triethylaluminum (catalyst component II) and 105 mg of the solid catalyst component IB were used. The yield of polypropylene was 178 g which corresponded to a yield on Ti of 178 kg and a yield on catalyst of 1.7 kg. I.I. was 96.0%.

EXAMPLES A4 THROUGH A14

Solid catalyst components IB were prepared according to the procedure set forth in Example A3 except that instead of benzoyl chloride, various halogen compounds were used as the constituent (d). Then, polymerization of propylene was carried out. The results are shown in Table A1.

TABLE A1

| | | Solid catalyst component (IB) | | | | Polymerization of propylene (1 lit. autoclave, liquefied propylene 0.8 lit., 70° C, 1 hour) | | | | |
|---|---|---|---|---|---|---|---|---|---|---|
| Example No. | Halogen compound (constituent (d)) | | Ti content (wt %) | TEA* (mg) | Solid catalyst component (mg) | Yield of PP* (g) | Yield on catalyst (kg) | Yield on Ti (kg) | I.I. (%) |
| A 4 | p-Anisoyl chloride | (3 ml) | 1.1 | 20 | 45 | 240 | 5.32 | 480 | 94.4 |
| A 5 | p-Toluyl chloride | (3 ml) | 1.0 | 20 | 50 | 247 | 4.95 | 493 | 94.5 |
| A 6 | Acetyl iodide | (3 ml) | 1.2 | 15 | 42 | 190 | 4.51 | 380 | 92.9 |
| A 7 | Silicon tetrachloride | (3 ml) | 1.2 | 15 | 42 | 276 | 6.58 | 551 | 93.5 |
| A 8 | Trimethylchlorosilane | (3 ml) | 1.3 | 15 | 38 | 204 | 5.37 | 409 | 93.9 |
| A 9 | Iodine trichloride | (3 g) | 1.2 | 20 | 42 | 198 | 4.21 | 395 | 93.8 |
| A 10 | Sulfur monochloride | (4 g) | 1.4 | 20 | 36 | 179 | 4.97 | 358 | 93.1 |
| A 11 | Bromine | (3 g) | 1.6 | 20 | 31 | 215 | 6.94 | 431 | 93.5 |
| A 12 | Iodine | (5 g) | 1.4 | 20 | 36 | 198 | 5.50 | 395 | 93.7 |
| A 13 | Ethyl iodide | (3 ml) | 1.2 | 15 | 42 | 210 | 5.00 | 420 | 92.7 |
| A 14 | Benzoyl chloride & silicon tetrachloride | (1.5 ml) (3 ml) | 1.0 | 16 | 40 | 183 | 4.56 | 456 | 95.9 |

*TEA and PP stand respectively for Triethylaluminum and Polypropylene in Table A1 and the following Tables.

EXAMPLES A15 THROUGH 20

Solid catalyst components IA were prepared by the procedure described in item (2) of Example A1 except that various compounds of the constituent (b) were used instead of ethyl benzoate. Polymerization of propylene was carried out wherein each of the resultant solid catalyst components IA and triethylaluminum was used. The results are shown in Table A2.

TABLE A2

| | Solid catalyst component (IA) | | Polymerization of propylene (1 lit. autoclave, liquefied propylene 0.8 lit., 70° C., 1 hour) | | | | | |
|---|---|---|---|---|---|---|---|---|
| Example No. | Constituent b | Ti content (wt %) | TEA (mg) | Solid catalyst component (mg) | Yield of PP (g) | Yield on catalyst (kg) | Yield on Ti (kg) | I.I. (%) |
| A 15 | Methyl benzoate | 1.4 | 15 | 36 | 225 | 6.20 | 450 | 91.0 |
| A 16 | Isopropyl benzoate | 1.5 | 15 | 33 | 263 | 7.95 | 526 | 92.3 |
| A 17 | p-Ethyl toluylate | 1.5 | 15 | 33 | 210 | 6.36 | 420 | 91.5 |
| A 18 | p-Ethyl anisate | 1.7 | 20 | 29 | 189 | 6.51 | 378 | 90.5 |
| A 19 | Ethyl acrylate | 1.4 | 20 | 36 | 103 | 2.86 | 206 | 93.4 |
| A 20 | Isopropyl methacrylate | 1.5 | 20 | 33 | 98 | 2.97 | 196 | 93.8 |

EXAMPLES A21 THROUGH A27

Each 5 g of the co-pulverized product of the constituent (a) and ethyl benzoate [constituent (b)] which was obtained according to the procedure set forth in item (2) of Example A1 was slurried in 50 ml of 1,2-dichloroethane. Then, 15 ml of the titanium trichloride solution obtained in item 1) of Example A2 was added to each slurry at room temperature and the mixture was stirred at that temperature for 2 hours. Thereafter, the solid product was separated from the liquid phase and washed three times with 50 ml of 1,2-dichloroethane. Then, 50 ml of 1,2-dichloroethane and various compounds of the constituent (d) were added to the solid product and the mixture was heated to reflux it for 2 hours. Again, the solid product was separated from the liquid phase and washed three times with 50 ml of 1,2-dichloroethane and five times with n-hexane, and then dried under vacuum to obtain a solid catalyst component IB. The titanium content of these catalysts components and the results of the propylene polymerization are shown in Table A3.

TABLE A3

| | Solid catalyst component (IB) | | | Polymerization of propylene (1 lit. autoclave, liquefied propylene 0.8 lit., 70° C., 1 hour) | | | | | |
|---|---|---|---|---|---|---|---|---|---|
| Example No. | Constituent d | | Ti content (wt %) | TEA (mg) | Solid catalyst component (mg) | Yield of PP (g) | Yield on catalyst (kg) | Yield on Ti (kg) | I.I. (%) |
| A 21 | Iodine trichloride | 0.5g | 0.91 | 20 | 55 | 261 | 4.75 | 522 | 94.3 |
| A 22 | Iodine monochloride | 0.5g | 0.87 | 20 | 57 | 258 | 4.53 | 516 | 92.9 |
| A 23 | Sulfur monochloride | 0.5g | 0.95 | 20 | 53 | 250 | 4.71 | 500 | 93.8 |
| A 24 | Sulfur dichloride | 0.4g | 0.98 | 20 | 51 | 267 | 5.24 | 534 | 94.0 |
| A 25 | Phosphorus pentachloride | 0.5g | 1.2 | 15 | 42 | 227 | 5.40 | 454 | 93.5 |
| A 26 | Bromine | 0.7g | 1.0 | 15 | 50 | 196 | 3.92 | 392 | 92.8 |
| A 27 | Iodine | 0.5g | 0.98 | 15 | 51 | 205 | 4.02 | 410 | 93.7 |

EXAMPLES A28 THROUGH A35

The solid catalyst component IA prepared according to the procedure set forth in item (2) of Example A1 was slurried in 50 ml of 1,2-dichloroethane. Various constituents (d) were added to the slurry and heated to reflux it for 2 hours. Thereafter, the solid product was separated from the liquid phase and washed three times with 50 ml of 1,2-dichloroethane and three times with n-hexane to obtain a fresh solid catalyst component IB. The Ti content of these catalysts and the results of the propylene polymerization are shown in Table A4.

aluminum was slowly added dropwise to the dispersion under water-cooling while stirring. Thereafter, the mixture was heated to reflux it for 2 hours. The solid reaction product was separated from the liquid phase and washed with n-hexane until no aluminum could be detected in the wash. Then, the product was dried under

TABLE A4

| Example No. | Solid catalyst component (IB) | | | TEA (mg) | Polymerization of propylene (1 lit. autoclave, liquefied propylene 0.8 lit., 70° C., 1 hour) | | | | |
|---|---|---|---|---|---|---|---|---|---|
| | Constituent d | | Ti content (wt %) | | Solid catalyst component (mg) | Yield of PP (g) | Yield on catalyst (kg) | Yield on Ti (kg) | I.I. (%) |
| A 28 | Iodine trichloride | 0.5g | 0.96 | 20 | 52 | 289 | 5.56 | 578 | 94.8 |
| A 29 | Sulfur monochloride | 0.3g | 1.2 | 20 | 42 | 274 | 6.52 | 548 | 93.8 |
| A 30 | Sulfur dichloride | 0.2g | 1.1 | 20 | 45 | 280 | 6.22 | 560 | 94.7 |
| A 31 | Iodine | 0.4g | 0.91 | 20 | 55 | 258 | 4.69 | 516 | 94.1 |
| A 32 | Ethyl iodide | 0.4g | 0.86 | 20 | 58 | 309 | 5.32 | 618 | 94.5 |
| A 33 | Benzyl iodide | 0.5g | 0.82 | 20 | 61 | 283 | 4.64 | 566 | 95.1 |
| A 34 | Iodoform | 0.9g | 0.81 | 20 | 62 | 272 | 4.39 | 542 | 95.2 |
| A 35 | Allyl iodide | 1.8g | 1.2 | 20 | 42 | 132 | 3.14 | 264 | 95.2 |

Comparative Example A1

A product corresponding to the solid catalyst component IA was prepared according to the procedure set forth in item (2) of Example A1 except that 20 g of magnesium hydroxychloride was used instead of the constituent (a). The titanium content of the product was 2.5% by weight. The results of propylene polymerization are shown in Table A5.

Comparative Example A2

A solid catalyst component (corresponding to the component IA) was prepared according to the procedure set forth in Comparative Example A1 except that ethyl benzoate was not added when magnesium hydroxychloride was pulverized. The titanium content of the product was 0.18% by weight. The results of the propylene polymerization are shown in Table A5.

Comparative Example A3

45 g of magnesium chloride hexahydrate was dispersed in 600 ml of n-heptane and 678 ml of triisobutyl vacuum. The yield was 25.8 g. A solid catalyst component (corresponding to the component IA) was prepared according to the procedure described in item (2) of Example 1 except that the solid reaction product was used instead of the constituent (a). The titanium content of the resultant component was 9.1% by weight. The results of the propylene polymerization are shown in Table A5.

Comparative Examples A4 through A6

A product corresponding to the constituent (a) was prepared according to the procedure described in item (1) of Example A1 except that instead of ethylaluminum dichloride, various organometal compounds were used in a quantity of 1.5 moles per mole of magnesium hydroxychloride. A solid catalyst component (corresponding to the component IA) was prepared by using the above described product according to the procedure described in item (2) of Example A1. The titanium content of the component and the results of the propylene polymerization are shown in Table A6.

TABLE A5

| Comparative Example No. | Polymerization condition | | | | Result of polymerization | | | |
|---|---|---|---|---|---|---|---|---|
| | Polymerization method | TEA (mg) | Solid catalyst component (mg) | Polymerization time (min.) | Yield of PP (g) | Yield on Ti (kg) | Yield on catalyst (kg) | I.I. (%) |
| A1 | The same as that described in item (3) of Example A1 | 40 | 40 | 60 | 24.5 | 24.5 | 0.61 | 61.9 |
| A2 | | 40 | 555 | 60 | 30.0 | 30.0 | 0.054 | 43.9 |
| A3 | | 40 | 5.5 | 60 | 65.4 | 65.4 | 11.9 | 35.5 |

TABLE A6

| Comparative Example No. | Organometallic compound used in the preparation of the constituent a | Ti content of solid catalyst component (wt %) | Polymerization of propylene (1 lit. autoclave, liquefied propylene 0.8 lit., 70° C., 1 hour) | | | | |
|---|---|---|---|---|---|---|---|
| | | | TEA (mg) | Solid catalyst component (mg) | Yield of PP (g) | Yield on catalyst (kg) | Yield on Ti (kg) | I.I. (%) |
| A 4 | Butylmagnesium chloride* BuMgCl | 2.1 | 40 | 48 | 176 | 3.67 | 176 | 46.5 |
| A 5 | TEA* Et₃Al | 4.8 | 40 | 21 | 3.1 | 0.15 | 3.1 | 47.3 |
| A 6 | Diethylaluminum chloride* | 5.2 | 40 | 19 | 18.5 | 0.97 | 18.5 | 58.6 |

TABLE A6-continued

| Comparative Example No. | Organometallic compound used in the preparation of the constituent a | Ti content of solid catalyst component (wt %) | TEA (mg) | Solid catalyst component (mg) | Yield of PP (g) | Yield on catalyst (kg) | Yield on Ti (kg) | I.I. (%) |
|---|---|---|---|---|---|---|---|---|
| | Et₂AlCl | | | | | | | |

*The magnesium hydroxychloride used was pulverized in a vibration mill for 48 hours.

EXAMPLES A36 THROUGH A38

60 g of the constituent (a) obtained in item (1) of Example A1 was suspended in 300 ml of n-heptane and 18 ml of benzoyl chloride [constituent (d)] was added to the suspension. The mixture was then heated to reflux it for 5 hours. The solid product was separated and washed five times with 300 ml of n-hexane and then dried under vacuum. Then, 20 g of the dried powders was co-pulverized together with 6 ml of ethyl benzoate [constituent (b)] and various constituents (d) in a vibration mill for 12 hours. 5 g of each of the co-pulverized products was placed in each of a three-neck flask and 50 ml of n-hexane and 5 ml of titanium tetrachloride were added to the flask. Thereafter, the content of the flask was heated to reflux it for 2 hours. The solid product was separated from the liquid phase and washed ten times with n-hexane to obtain each of the solid catalyst component IB. The titanium content of the component and the results from the propylene polymerization using these solid catalyst component IB are shown in Table A7.

solid catalyst component IB. The component IB was found to contain 1.1% by weight of titanium.

(3) Polymerization of propylene

Polymerization of propylene was carried out at a temperature of 70° C. for 1 hour by the procedure described in Example A4 except that 35.4 mg of the solid catalyst component IB and 10 mg of triethylaluminum (TEA) were used. The yield of polypropylene was 206 g. This yield corresponds to a yield on Ti of 515 kg and a yield on catalyst of 5.8 kg. I.I. was 94.5%.

EXAMPLE A40

(1) Preparation of a catalyst component IB 20 g of the constituent (a) prepared by the procedure described in item (1) of Example A1, 9 ml of ethyl benzoate and 1.5 ml of benzoyl chloride were co-pulverized in a vibration mill for 12 hours. 5 g of the resultant product was slurried in 40 ml of 1,2-dichloroethane. To this slurry was added 40 ml of titanium tetrachloride and the mixture was subjected to reaction with stirring at a temperature of 80° C. for 2 hours. A solid product was separated from the liquid phase and washed three

TABLE A7

| Example No. | Constituent d added during co-pulverization | | Ti content of solid catalyst component IB (wt %) | Polymerization of propylene (1 lit. autoclave, liquefied propylene 0.8 lit., 70° C., 1 hour) | | | | |
|---|---|---|---|---|---|---|---|---|
| | | | | TEA (mg) | Solid catalyst component IB (mg) | Yield of PP (g) | Yield on Ti (kg) | Yield on catalyst (kg) | I.I (%) |
| A 36 | Silicon tetrachloride | 3ml | 1.8 | 20 | 28 | 254 | 9.10 | 508 | 94.5 |
| A 37 | Bismuth trichloride | 2g | 2.2 | 20 | 45 | 302 | 6.70 | 302 | 93.3 |
| A 38 | Antimony trichloride | 5.3g | 2.1 | 20 | 24 | 145 | 6.00 | 290 | 94.8 |

EXAMPLE A39

(1) Preparation of the constituent (a)

A constituent (a) was prepared by the procedure described in item (1) of Example A1 except that 30 g of magnesium hydroxychloride powder, which was obtained by pulverizing the magnesium hydroxychloride prepared by the procedure described in item (1) of Example A1 in a vibration mill for 59 hours, 145 g of ethylaluminum sesquichloride and 200 ml of n-hexane as a solvent were used. The yield was 22 g.

(2) Preparation of the catalyst component IB 20 g of the above described constituent (a), 6 ml of ethyl benzoate and 3 ml of benzoyl chloride were co-pulverized in a vibration mill for 12 hours to obtain reddish brown powder. To 5 g of the powder were added 40 ml of n-hexane and 40 ml of titanium tetrachloride and the resulting mixture was reacted together at a temperature of 80° C. for 2 hours. A brown solid product was separated from the liquid phase and washed ten times with 50 ml of n-hexane to obtain a times with 50 ml of 1,2-dichloroethane and seven times with 50 ml of n-hexane to obtain a solid catalyst component IB. The component IB was found to contain 1.7% by weight of titanium.

(2) Polymerization of propylene

Polymerization of propylene was carried out at a temperature of 70° C. for 1 hour by the procedure described in item (3) of Example A1 except that 23.5 mg of the above described solid catalyst component IB and 16 mg of triethylaluminum were used. The yield of polypropylene was 218 g which corresponded to a yield on Ti of 546 kg and a yield on catalyst of 9.29 kg. I.I. was 94.2%.

EXAMPLES A41 THROUGH A43

500 ml of n-hexane was introduced into a 1 liter autoclave to which various organoaluminum compounds (catalyst component II) and the solid catalyst component IB obtained in Example A40 were added. Then, the polymerization of ethylene in the autoclave was carried out at a temperature of 80° C. and a partial pressure of ethylene of 5 kg/cm² and partial pressures of hydrogen of 1.25 and 2.15 kg/cm² for 90 minutes. The results are shown in Table A8.

EXAMPLE A44

20 g of the constituent (a) obtained in item (1) of Example A1, 5 ml of ethyl acetate [constituent (b)] and 5 ml of tin tetrachloride [constituent (d)] were co-pulverized in a vibration mill for 12 hours. A solid catalyst component IB was prepared by using the co-pulverized product according to the procedure described in Example A41. The resultant component IB was found to contain 1.9% by weight of titanium.

Polymerization of ethylene was carried out by using the obtained solid catalyst component IB under the same conditions as those described in Example A41 through A43. The results are shown in Table A8.

portion was filtered off and the resulting product was washed five times with toluene. The yield of the solid product was 96.7 g. Quantitative analysis of the product by chelatometric titration indicated that it contained 1.90% by weight of aluminum and 25.2% by weight of magnesium. Also, the product was found to contain 67.9% by weight of chlorine and 0.41% by weight of silicon by quantitative analysis upon potentiometric titration and atom absorptiometry. It had a specific surface area of 59 m²/g as measured by a BET method.

(2) Preparation of a catalyst component IA 20 g of the above described constituent (a) and 9 ml of ethyl benzoate [constituent (b)] were co-pulverized in a vibration mill for 12 hours. The co-pulverized product was reacted with titanium tetrachloride by the procedure described in Example A40 to obtain a solid catalyst

TABLE A8

| | Polymerization condition | | | | Result of polymerization | | | | | |
|---|---|---|---|---|---|---|---|---|---|---|
| Example No. | Organoaluminum compound (mg) | | Solid catalyst component (mg) | Partial pressure of hydrogen (kg/cm²) | Yield of polyethylene (g) | Yield on catalyst*³ (kg) | Yield on Ti*⁴ (kg) | MI₂*¹ (g/10 min) | MI₁₀*² (g/10 min) | MI₁₀/MI₂ |
| A 41 | Triethylaluminum | (80) | 10 | 1.25 | 160 | 16.0 | 941 | 0.07 | 0.60 | 8.5 |
| A 42 | Triisobutyl-aluminum | (200) | " | 2.15 | 77 | 7.7 | 591 | 0.14 | 0.99 | 7.1 |
| A 43 | Tri-n-decyl-aluminum | (450) | " | " | 72 | 7.2 | 554 | 0.11 | 0.83 | 7.5 |
| A 44 | Triisobutyl-aluminum | (200) | " | " | 183 | 18.3 | 964 | 0.29 | 4.6 | 16 |

*¹A melt index at a temperature of 190° C. under a load of 2.16 kg.
*²A melt index at a temperature of 190° C. under a load of 10 kg.
*³Yield of polyethylene per gram of solid catalyst component.
*⁴Yield of polyethylene per gram of titanium atom.

EXAMPLE A45

20 g of the constituent (a) obtained in Example 1, 6 ml of ethyl benzoate [constituent (b)] and 3 g of dimethylpolysiloxane [a viscosity of 100 cs; constituent (d)] were co-pulverized in a vibration mill for 12 hours. 5 g of the co-pulverized product was slurried in 40 ml of n-hexane and to this slurry was added 40 ml of titanium tetrachloride [constituent (c)] and the mixture was stirred at a temperature of 80° C. for 2 hours. The resulting solid product was separated from the liquid phase and washed ten times with 50 ml of n-hexane to obtain a solid catalyst component IB. This product was found to contain 1.56% by weight of titanium.

Polymerization of propylene was carried out at a temperature of 70° C. for 1 hour by the procedure described in Example 1 except that 8 mg of triethylaluminum and 32.1 mg of the above described solid catalyst component IB. The yield of polypropylene was 248 g which corresponded to a yield on Ti of 496 kg and a yield on catalyst of 7.7 kg. I.I. was 92.7%.

EXAMPLE B1

(1) Preparation of the constituent (a)

To the solid reaction product obtained by reacting 100 g of magnesium hydroxychloride and 205 ml of ethylaluminum chloride according to the procedure described in item (1) of Example A1 was added 150 ml of hexamethyldisiloxane and the mixture was refluxed for 4 hours by heating it. Thereafter, the liquid phase component IA. This product was found to contain 1.75% by weight of titanium as measured by colorimetric analysis.

(3) Polymerization of propylene

The results are shown in Table B1.

EXAMPLE B2

(1) Preparation of a catalyst component IB 20 g of the constituent (a) obtained in Example B1, 6 ml of ethyl benzoate [constituent (b)] and 3 ml of silicon tetrachloride [constituent (d)] were co-pulverized in the same vibration mill as that described in Example B1 for 12 hours. 5 g of the co-pulverized product was reacted with titanium tetrachloride [constituent (c)] under the same conditions as those described in Example B1 to obtain a catalyst component IB. This product was found to contain 1.29% by weight of titanium.

(2) Polymerization of propylene

The results are shown in Table B1.

EXAMPLE B3

(1) Preparation of a catalyst component IB

A catalyst component IB was prepared by the procedure described in Example B2 except that reaction with titanium tetrachloride was carried out in hexane. The resulting product was found to contain 1.03% by weight of titanium.

(2) Polymerization of propylene

The results are shown in Table B1.

TABLE B1

| | Polymerization condition | | | | Results of polymerization | | | |
|---|---|---|---|---|---|---|---|---|
| Polymeriza- | Triethyl- | Catalyst component | Ethyl benzoate added during poly- | Polymerization | Yield of | Yield on | Yield on | Bulk densi- |

TABLE B1-continued

| Example No. | tion method | aluminum (mg) | IA or IB (mg) | merization (mg) | time (min.) | PP (g) | Ti (kg) | catalyst (kg) | I.I. (%) | ty (g/ml) |
|---|---|---|---|---|---|---|---|---|---|---|
| B1 | I*1 | 12 | 28.6 | — | 40 | 228 | 456 | 8.0 | 93.0 | |
| B2 | I*1 | 6 | 31.0 | — | 16 | 323 | 808 | 10.4 | 96.2 | 0.30 |
| B3 | I*1 | 6 | 38.8 | — | 40 | 296 | 740 | 7.6 | 97.9 | 0.34 |
| | | | | | | Pow-*3 dery polymer | Amor-*4 phous polymer | | | |
| B2 | II*2 | 20 | 46.5 | — | 120 | 144 | —*5 | 239 | 3.1 | 96.1 | 0.24 |
| B3 | II*2 | 20 | 77.7 | — | 120 | 310 | —*5 | 388 | 4.0 | 96.5 | 0.31 |
| B3 | II*2 | 40 | 58.2 | 10.5 | 120 | 146 | 1.0 | 245 | 2.5 | 98.6*6 | 0.28 |

*1Bulk polymerization: (the same as item 3) of Example A1
*2Slurry polymerization: 1 lit. autoclave, n-hexane 0.5 lit., polymerization temp. 60° C. propylene pressure 9 kg/cm².
*3A solid which was obtained by filtering a polymerized slurry and dried under vacuum.
*4A rubbery polymer obtained by condensing the filtrate of a polymerization slurry.
*5In the example, an amorphous polymer is not particularly separated because the total slurry was stripped.
*6The residue obtained after the powdery polymer was extracted with n-heptane is 99.2%.

Accordingly, I.I. $= \frac{146 \times 99.2}{146 + 1} \times 100 = 98.6\%$.

EXAMPLES B4 THROUGH B6

The preparation of a constituent (a) was carried out by the procedure described in Example B1 except that various siloxane compounds were used instead of hexamethyldisiloxane and the preparation of a catalyst component IB was carried out by the procedure described in Example B3. The bulk polymerization of propylene was carried out by the procedure described in Example B1. The yield and composition of the constituent (a), the titanium content of the catalyst component IB and the results of the propylene polymerization are shown in Table B2.

EXAMPLES B7 THROUGH B15

A constituent (a) was prepared by the procedure described in Example B1 except that the solid reaction product between magnesium hydroxychloride and ethylaluminum dichloride was washed with 1,2-dichloroethane before it was treated with hexamethyldisiloxane. The constituent (a) had the following elemental composition: in a weight percent, 1.47% aluminum, 25.5% magnesium, 64.4% chlorine and 0.51% silicon.

A catalyst component IB was prepared by the procedure described in Example B3 except that the above described constituent (a) and various constituents (d), instead of silicon tetrachloride, were used. The bulk polymerization of propylene was carried out by the procedure described in Example B1. The results are shown in Table B3.

TABLE 2B

| Example No. | Siloxane, compound used in the preparation of the constituent a | Yield of the constituent a (g) | Composition of the constituent a (wt %) | | Titanium content of the catalyst component IB (wt %) | Polymerization condition of propylene | | | Result of Polymerization | | | |
|---|---|---|---|---|---|---|---|---|---|---|---|---|
| | | | | | | Triethyl-aluminum (mg) | Catalyst component IB(mg) | Polymerization time (min) | Yield of PP (g) | Yield on Ti (kg) | Yield on catalyst (kg) | I.I. (%) |
| B4 | Dimethylpolysiloxane (viscosity 1 cs) 150 ml | 95.8 | Al Mg Cl Si | 1.19 24.3 59.4 0.51 | 0.94 | 8 | 42.6 | 20 | 276 | 690 | 6.4 | 97.0 |
| B5 | Methylhydrogenpolysiloxane (viscosity 20 cs) 150 ml | 91.4 | Al Mg Cl Si | 1.18 22.0 56.6 1.2 | 1.43 | 8 | 23.0 | 60 | 188 | 468 | 6.7 | 94.3 |
| B6 | Methylphenyl-* polysiloxane (viscosity 3000 cs) 150 ml | 98.8 | Al Mg Cl Si | 1.48 24.7 62.1 0.94 | 1.38 | 8 | 29.0 | 60 | 201 | 502 | 6.9 | 94.8 |

*200 ml of toluene was used as a reaction medium.

TABLE B3

| Example No. | Constituent d used in the preparation of the catalyst component IB | | Titanium content of the catalyst component IB (wt %) | Polymerization condition of propylene | | | Result of polymerization | | | |
|---|---|---|---|---|---|---|---|---|---|---|
| | | | | Triethyl-aluminum (mg) | Catalyst component IB (mg) | Polymerization time (min.) | Yield of PP (g) | Yield on Ti (kg) | Yield on catalyst (kg) | I.I. (%) |
| B7 | Aluminum chloride | 3g | 1.18 | 6.0 | 33.9 | 45 | 298 | 745 | 8.8 | 93.3 |
| B8 | Ethoxyaluminum dichloride | 3g | 3.12 | 8.0 | 12.8 | 60 | 120 | 295 | 9.2 | 92.6 |
| B9 | Trimethylsiloxy-aluminum dichloride | 3g | 2.33 | 8.0 | 17.2 | 60 | 255 | 635 | 14.8 | 93.8 |
| B10 | Trimethylsilyl-chloride | 3g | 1.25 | 6.0 | 32.0 | 33 | 317 | 793 | 9.9 | 96.6 |
| B11 | Bismuth chloride | 3g | 1.23 | 6.0 | 32.5 | 50 | 289 | 723 | 8.9 | 94.2 |
| B12 | Dimethylpolysiloxane (1 cs) | 3.8g | 0.99 | 8.0 | 40.4 | 60 | 242 | 603 | 6.0 | 96.5 |
| B13 | Phenylmethylpolysiloxane (3000cs) | 3g | 1.10 | 8.0 | 36.4 | 60 | 263 | 658 | 7.2 | 95.8 |
| B14 | Polysiloxane resin* | 3g | 1.92 | 6.0 | 20.8 | 60 | 187 | 470 | 9.0 | 94.3 |
| B15 | Trimethylsiloxy-aluminum dichloride + Silicon tetrachloride | 3g 3 ml | 1.65 | 8.0 | 24.2 | 60 | 293 | 733 | 12.1 | 96.3 |

*Trade name "KR-220", manufactured by Shinetsu Kagaku.

What is claimed is:

1. A process for producing steroregular olefin polymers comprising causing an ethylenically unsaturated monomer comprising at least one olefin monomer having at least three carbon atoms to contact with a catalyst system comprising a combination of a catalyst component IA and a catalyst component III, the catalyst component IA being a solid product obtained by contacting the following constituents (a), (b) and (c) together:

(a) a solid reaction product obtained by reacting magnesium hydroxyhalide with an organoaluminum compound at a temperature of about 0° to 200° C. for about 30 minutes to 10 hours, in an amount of 0.3 to 20 moles of said organoaluminum compound per mole of said magnesium hydroxyhalide so that the reaction of said organoaluminum compound and magnesium hydroxyhalide is substantially complete, said organoaluminum compound having the formula $R_nAlX_{3-n}$ wherein R represents a hydrocarbon residue having from 1 to 20 carbon atoms, X represents a halogen atom and n represents a number satisfying the formula: $0.1 < n \leq 1.5$, (b) an electron donor which is a carboxylic acid ester, and (c) a halogen compound of titanium, the ratio of constituents (a):(b):(c) being 100 g.:0.05 to 1.0 mole:0.005 to 100 moles; and the catalyst component II being an organometal compound of a metal of Groups I through III of the periodic table.

2. A process for producing steroregular olefin polymers comprising causing an ethyleneically unsaturated monomer comprising at least one olefin monomer having at least three carbon atoms to contact with a catalyst system comprising a combination of a catalyst component IB and a catalyst component II, the catalyst component IB being a solid product obtained by contacting the following (a), (b), (c) and (d) together (a) a solid reaction product obtained by reacting magnesium hydroxyhalide with an organoaluminum compound at a temperature of about 0° to 200° C. for about 30 minutes to 10 hours, in an amount of 0.3 to 20 moles of said organoaluminum compound per mole of said magnesium hydroxyhalide so that the reaction between said organoaluminum compound and said magnesium hydroxy chloride is substantially complete, said organoaluminum compound having the formula $R_nAlX_{3-n}$ wherein R represents a hydrocarbon residue having from 1 to 20 carbon atoms, X represents a halogen atom and n represents a number satisfying the formula: $0.1 < n \leq 1.5$ (b) an electron donor which is a carboxylic acid ester (c) a halogen compound of titanium, (d) at least one compound or element selected from the group consisting of:

(i) a halogen compound selected from compounds having a halogen bond to boron, aluminum, gallium, carbon, silicon, germanium, tin, nitrogen, phosphorus, antimony, bismuth, sulfur, tellurium or selenium, (ii) a halogen selected from chlorine, bromine and iodine, and (iii) an interhalogen selected from iodine monochloride and iodine trichloride, the ratio of the constituents (a):(b):(c):(d) being 100 g.:0.05 to 1.0 mole:0.005 to 100 moles:0.01 to 10 moles the catalyst component II being an organometal compound of a metal of Groups I through III of the periodic table.

3. A process for producing steroregular olefin polymers comprising causing an ethylenically unsaturated monomer comprising at least one olefin monomer having at least three carbon atoms to contact with a catalyst system comprising a combination of a catalyst component IA and a catalyst component II, the catalyst component IA being a solid product obtained by contacting the following constituents (a), (b) and (c)

(a) a solid product obtained by reacting a solid reaction product obtained by reaction between a magnesium hydroxyhalide and an organoaluminum compound at a temperature of about 0° to 200° C.

for about 30 minutes to 10 hours, in an amount of 0.3 to 20 moles of said organoaluminum compound per mole of said magnesium hydroxyhalide so that the reaction between said organoaluminum compound and said magnesium hydroxy chloride is substantially complete said organoaluminum compound having the formula $R_nAlX_{3-n}$ wherein R represents a hydrocarbon residue having from 1 to 20 carbon atoms, X represents a halogen atom and n represents a number satisfying the formula: $0.1 < n \leq 1.5$, with a siloxane compound in an amount of no less than 5 g. per 100 g. of said reaction product, (b) an electron donor which is a carboxylic acid ester (c) a halogen compound of titanium, the ratio of constituents (a):(b):(c) being 100 g.:0.05 to 1.0 mole:0.005 to 100 moles; and the catalyst component II being an organometallic compound of a metal of Groups I through III of the periodic table and/or an adduct or reaction product of an organometallic compound of a metal of Groups I through III of the periodic table and an electron donor.

4. A process for producing steroregular olefin polymers comprising causing an ethylenically unsaturated monomer comprising at least one olefin monomer having at least three carbon atoms to contact with a catalyst system comprising a combination of a catalyst component IB and a catalyst component II, the catalyst component IB being a solid product obtained by contacting the following constituents (a),(b),(c) and (d)

a solid product obtained by reacting a solid reaction product obtained by reaction between magnesium hydroxyhalide and an organoaluminum compound at a temperature of about 0° to 200° C. for about 30 minutes to 10 hours, in an amount of 0.3 to 20 moles of said organoaluminum compound per mole of said magnesium hydroxyhalide so that the reaction between said organoaluminum compound and said magnesium hydroxy chloride is substantially complete said organoaluminum compound having the formula $R_nAlX_{3-n}$ wherein R represents a hydrocarbon residue having from 1 to 20 carbon atoms, X represents a halogen atom and n represents a number satisfying the formula: $0.1 < n \leq 1.5$, with a siloxane compound in an amount of no less than 5 g. per 100 g. of said reaction product, (b) an electron donor which is a carboxylic acid ester (c) a halogen compound of titanium, and (d) at least one compound or element selected from the group consisting of:

(i) a halogen compound selected from compounds having a halogen bond to boron, aluminum, gallium, aluminum, carbon, silicon, germanium, tin, nitrogen, phosphorus, antimony, bismuth, sulfur, tellurium or selenium (ii) a halogen selected from chloride, bromine and iodine, (iii) an interhalogen selected from iodine monochloride and iodine trichloride, and (iv) a siloxane compound the ratio of constituents (a):(b):(c):(d) being 100 g.:0.05 to 1.0 mole:0.005 to 100 moles:0.01 to 10 moles the catalyst component II being an organometallic compound of a metal of Groups I through III of the periodic table and/or an adduct or reaction product of an organometallic compound of a metal of Groups I through III of the periodic table and an electron donor.

5. A process as claimed in any one of claims 1 to 4 wherein the organoaluminum compound of the constituent (a) is an alkyl- or aryl-aluminum dichloride.

6. A process as claimed in any one of claims 1 to 4 wherein said solid reaction product of constituent (a) is obtained by reacting reagents consisting essentially of said magnesium hydroxyhalide and said organoaluminum compound of formula $R_nAlX_{3-n}$.

7. A process as claimed in any one of claims 1 to 4 wherein the ethylenically unsaturated monomer is propylene or a mixture of propylene and ethylene, the ethylene content being no greater than 20% by weight of propylene.

8. A process as claimed in claims 2 or 4 in which (i) is a halogen compound selected from compounds having a halogen bond to aluminum, silicon, bismuth, carbon, antimony or tin.

* * * * *